Patented Dec. 21, 1948

2,456,919

UNITED STATES PATENT OFFICE 2,456,919

METHOD FOR IMPROVING WATER-RESISTANT CHARACTERISTICS OF RESINS AND RESINOUS ARTICLES, AND RESINOUS PRODUCTS RESULTING THEREFROM

Loring Coes, Jr., Brookfield, Mass., assignor to Norton Company, Worcester, Mass., a corporation of Massachusetts No Drawing. Original application September 28, 1942, Serial No. 459,956. Divided and this application April 1, 1947, Serial No. 738,718

12 Claims. (Cl. 260—39)

This invention relates to grinding wheels and other solid abrasive compositions, and more particularly to abrasive articles of the kind just mentioned that are bonded with organic or resin bonds, especially the polymerized condensation product of a primary aromatic amine with formaldehyde, and also to resins and their compositions and treatment, particularly for the making of abrasive articles of the above-mentioned kind. This application is a division of my copending application, Serial No. 459,956 filed September 28, 1942, now abandoned.

One of the objects of this invention is to provide an abrasive article of the above-mentioned character that will have good resistance to water where such abrasive articles have to be operated in the presence of or contact with a liquid coolant such as water; another object is to provide a simple and practical method for making such an abrasive article to give it good water-repellant or water-resisting properties without detrimentally detracting from the advantages achievable in structure, operation and method of making the abrasive articles utilizing resinous bonds of the above-mentioned character. Another object is to provide an abrasive article in which a halide, such as hydrogen chloride, can be made available at the grinding line and which has superior water-resistant properties achieved in a manner which will not detrimentally affect the liberation of, for example, hydrogen chloride at the grinding line.

Another object is to provide a resin that will resist weakening under the effects of water. Another object is to provide a heat-curable resin that can be cured without swelling during curing and that will also have superior water-resistant properties in the hardened or cured product.

Another object is to provide a practical and efficient method of making strong and water-resistant resins, with or without fillers, and with or without abrasive grains admixed therewith and that can be readily carried on in practice. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

It has heretofore been proposed to make grinding wheels and other solid abrasive compositions bonded with primary aromatic amine-formaldehyde resins that are hardened with poly-halogen compounds, several illustrative examples of which are hereinafter set forth, and it has been found that satisfactory and good abrasive articles, with good grinding characteristics, can thus be made. Moreover, according to such prior proposals, resins so hardened have been found to have many characteristics making them desirable for use in fields other than the field of abrasive articles. Resins and resinous bonds so made have, in the field of abrasive articles, the unique characteristic of making available or releasing at the grinding line an acid halide such as hydrogen chloride, hydrogen bromide or the like, to coact in achieving improved or superior grinding action. I have found, however, that grinding wheels so made develop various degrees of deficiency in repelling or resisting water where the wheel, as in some industrial uses, has to be operated during the grinding action under the cooling action of water, the same wheels, however, standing up excellently and with good results when operated "dry" such as for snagging, with the result that the wheel loses strength and its durability and grinding action become impaired.

I have discovered a reliable and efficient method and means for obviating or preventing the development of such deficiencies and I am thus enabled to produce both a resin and a resin-bonded abrasive article which stand up equally well when used or operated dry or devoid of water and when used or operated wet or in or moisture and when used or operated wet or in the presence of moisture or water.

In the production of resins or resinous products or resin-bonded abrasive articles, hardened by such poly-halogen compounds, a polymerization takes place in which the cross-linkage includes a linkage or bond of the halide, such as hydrogen chloride, to an amino group or to one or more nitrogen atoms and I believe that it is the affinity or attraction of this bonded or linked halide for water which is the cause of deficiency in water resistance, a deficiency which is sometimes of progressively increasing magnitude; as a result the resin or resinous bond can become absorptive of water and because of the linkage of the halide as part of the polymer, the halide is uniformly distributed, as it were, throughout the mass of the resin or of the resinous bond, and it is accordingly readily and uniformly throughout the mass available for progressive absorption or attraction of water and for possible interaction therewith. Physically the effect is somewhat like a swelling of what is otherwise a hard, tough and strong resinous body, and is accompanied by structural weakening and loss of strength where the resin or resin-bonded abrasive is subjected to moisture or water.

According to my invention, I am enabled, by the above-mentioned cross-linking, to retain a uniform distribution of the halide, illustratively hydrogen chloride, but to convert it into a phase and into a physical state such that, while still available for release at the grinding line when the resin is used as a bond for abrasive grain, it is not available or is in effect isolated so that it cannot function to attract or absorb the water throughout the resinous mass. Hence swelling, the loss of strength, and other detrimental actions otherwise caused by moisture or water are precluded from taking place. In effect, the halide becomes, according to my invention as I understand it, uniformly distributed in an infinite number of very minute, small physical entities of which each is totally enclosed in a cell of the resin from the polymer of which the halide is in effect physically and chemically detached, though the cross-linking accompanying the polymerization has been effective to achieve uniform distribution initially of the halide throughout the mass of the resin or resinous bond. Accordingly, the hardened resin is given good water-resistant properties and the abrasive article can operate and stand up just about as well when running wet as when running dry.

To better understand these features of my invention, several illustrations of primary aromatic amine-formaldehyde resins hardened with poly-halogen compounds are hereinafter set forth in connection with correspondingly illustrative structures of abrasive articles such as grinding wheels, to show first how the halide becomes linked as part of the polymer, and then I shall describe the means and method that I employ to convert the halide to a different phase or physical state to preclude it from attracting, absorbing or reacting with water to swell and weaken the structure, and though the illustrations are set forth in connection with the making of abrasive or grinding wheels, such illustrations are not to be interpreted in a limiting sense but as illustrative of hardened resins which, in course of hardening or curing, can be treated according to my invention.

The primary automatic amine which I now prefer to use is aniline. Aniline

or one of the other primary aromatic amines mentioned, or mixtures of two or more of such amines, is reacted with formaldehyde HCHO in the presence of a strong acid to produce a long chain polymer which, when an excess of formaldehyde above the stoichiometric proportions is used, for example 20% excess, has adjacent chains connected with methylene —$CH_2$— groups to form a tough, heat-resistant, semi-thermoplastic resin. I may add some of the formaldehyde after the initial condensation, in the form of paraformaldehyde, or by the addition of hexa-methylene-tetramine.

Since the invention is best illustrated in relation to grinding wheels and other solid abrasive compositions and articles, I provide a quantity of abrasive grain. Any abrasive grain may be used, for example, any of the varieties of alumina, such as emery, corundum, dense "regular" fused alumina, porous white fused alumina; silicon carbide and other hard carbides; quartz; glass; garnet; or diamonds. Two or more of these abrasives may be mixed, if desired.

Manufacturers usually prefer to use the dry granular mix method, with the cold press and the oven to make organic bonded grinding wheels because this combination of steps and features is the cheapest to carry out and, furthermore, generally gives uniform results. In the dry granular mix method the abrasive grains are placed in a mixing pan and are then wet with a suitable liquid; then powdered fusible resin is added, mixing is done to coat each granule with some of the powder and to leave a minimum of loose powder, then a mold is charged with the "dry granular mix" thus produced, the top plate is inserted, the mold is "closed" by means of an hydraulic press, the mold is then "stripped," the "green" wheel is taken to an oven and (at the same time as hundreds or thousands of others of varying sizes, shapes and compositions) it is cured to make the final composition and, after "truing" or "shaving," the final article. This method, in contradistinction to the use of the hot press with or without the autoclave and vice versa, has the advantage that ordinary ovens, in which thousands of "green" wheels can be stacked, are used; the hydraulic press is tied up by a given wheel for thirty seconds instead of thirty minutes, and the press need have no heated platens. This wetting of the abrasive grains by a liquid is called "plasticizing." It is preferred that the wettant be a solvent for the resin.

In the commercial manufacture of aniline-formaldehyde resin bonded grinding wheels and other solid abrasive products, only furfural has been used as this plasticizer-wettant. (Other aromatic-amine-aldehyde polymers have not been used commercially for the manufacture of grinding wheels and other solid abrasive products so far as I am aware.) The furfural cross-links the polymer and, therefore, converts it to the "infusible" condition. A stoichiometric quantity of aniline and formaldehyde condensed in the presence of a strong acid is believed to produce a resin which is structurally represented thus:

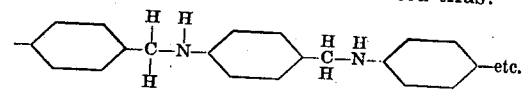

Such a resin cross-linked with furfural is believed to be represented thus.

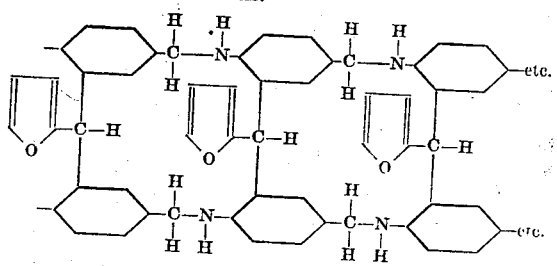

Ethers may be employed as plasticizers and hardening agents, such as are dealt with in my co-pending application, Serial No. 445,801, filed June 4, 1942, now Patent No. 2,309,575, producing a polymer having a halide, preferably and usually hydrogen chloride, attached or linked thereto.

Thus, I may employ dichlor diethyl ether or other polyglycol dichloride as the hardening agent and, in making abrasive articles, as the wettant-plasticizers for grinding wheels and other solid abrasive articles made out of abrasive grains bonded with primary aromatic-amine-formaldehyde resin with or without the use of other halogenated compounds, with or without other fillers, and with or without the use of other wettant plasticizers. To wet the abrasive grains at present I prefer to use dichlor diethyl ether alone. This ether is:

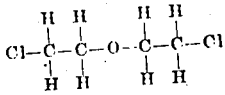

I believe it cross-links the aniline-formaldehyde polymer thus:

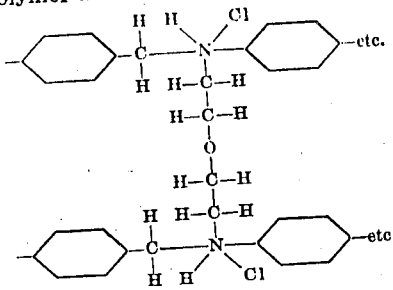

It will be noted that chlorine now appears in the amino group. When a grinding wheel thus made is used to grind, the heat generated by grinding releases hydrogen chloride at the grinding line.

Tri-glycol dichloride is written thus:

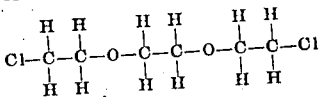

It will thus be seen that it is definitely related to dichlor diethyl ether which can also be called diglycol dichloride. Other polyglycol dichlorides may also be used. For instance, tetra-glycol dichloride would be written thus:

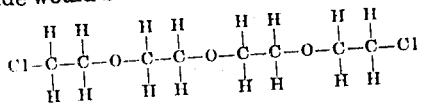

However, the compounds of large molecular weight, that is, having additional $C_2H_4$ groups, are solids and are not usable. Therefore, I use any poly-glycol dichloride selected from the group consisting of the di-, tri-, tetra-, and penta- poly-glycol dichlorides or mixtures of two or more of them. These ethers are monomeric compounds.

Example I

Two hundred and ten grams of #80 grit fused alumina is stirred with four and five-tenths cubic centimeters of dichlor diethyl ether. Twelve and eight-tenths grams of soluble anhydrite ($CaSO_4$) and forty-two and eight-tenths grams of aniline formaldehyde resin made from one and five-hundredths molecular proportions of formaldehyde are added. The whole is mixed. The free flowing granular mix is cold molded under a pressure of three tons to the square inch. The cold molded objects are then packed in sand and baked for eight hours at 100° C. Test bars made in this way showed a modulus of rupture of 2600 pounds to the square inch which indicates a high tensile strength for abrasive products made with this kind of resin.

Example II

Eight hundred and fifty-eight cubic centimeters of aniline is dissolved in eight liters of water containing nine and three-tenths mols of hydrochloric acid. To this is added seven hundred and fifty cubic centimeters of formalin solution containing four-tenths gram of formaldehyde per cubic centimeter. After standing for one hour, a quantity of sodium hydroxide is added equivalent to the hydrochloric acid present. The precipitated resin is filtered, washed, dried, and ground to a fine powder. Into each ten pounds of this powdered resin I mix two and two-tenths pounds of polyvinyl chloride. Twenty-eight and one-tenth pounds of a porous relatively pure grade of fused alumina abrasive #20 grit size is wet with twenty-three hundredths of a pound of triglycol dichloride. Then five and nine-tenths pounds of the above resin is intimately mixed with the fused alumina wet with dichlor diethyl ether spread in an eighteen inch mold with a five inch arbor, cold pressed under a pressure of three tons to the square inch, transferred to an oven, and baked for one hour and a half at 160° C.

Example III

Thirty-seven pounds of #14 mesh grit size fused alumina abrasive is placed in a mixing pan and wet with five hundred and forty cubic centimeters of triglycol dichloride. To this are added nine pounds of the resin of Example II and two pounds of cryolite. The mixture is spread in a sixteen inch mold with a six inch arbor and cold pressed under a pressure of three tons to the square inch. Then the "green" wheel is stripped from the mold and heated in an oven for eight hours at a temperature of 100° C.

Example IV

Eight hundred and eighty-five grams of #60 mesh grit size fused alumina is wet with twenty-five cubic centimeters of triglycol dichloride. One hundred and sixty grams of the powdered resin from Example II and forty-nine grams of chlorinated eicosane is added. After mixing to form a dry granular mix, it is spread in an eight inch mold and pressed under a pressure of one hundred and fifty tons per square inch and then stripped from the mold and baked at a temperature of 100° C. for eight hours.

Fully chlorinated eicosane is not readily available and as a practical matter, partially chlorinated eicosane is quite satisfactory. Furthermore, the name eicosane has been chosen as the proper chemical name for the product with twenty carbon atoms, more or less, sold under the trade-mark "Chlorcosane," which is probably a mixture of chlorinated high molecular weight paraffines averaging twenty carbon atoms or thereabouts.

For the acid used in condensing the resin, besides hydrochloric and phosphoric acids, any of the following acids or many others may also be used:

Hydriodic acid
Tri-chlor acetic acid
Di-chlor acetic acid
Maleic acid
Oxalic acid
Picric acid
Sulphuric acid The acid should be at least as strong as phosphoric acid to give the best results.

The various halogenated organic compounds mentioned herein cross-link the resin at the amino groups. The dichlor diethyl ether, as previously set forth, cross-links the resin at the amino groups. When this ether and also another halogenated compound are used the cross-linking of chains is effected by radicals from both of the chlorinated ether and the other halogenated compound, more or less at random and in proportion to the number of molecules of each present. It is believed, therefore, to be unnecessary to set forth herein any more structures but reference is made to co-pending application Serial No. 411,249, filed September 17, 1941, now abandoned, by my colleague, Samuel S. Kistler, assigned to the assignee hereof, wherein a great many representative structures which are believed to typify the conditions are set forth. In said prior application of Kistler, however, no dichlor diethyl ether is disclosed.

The reason why triglycol dichloride and dichlor diethyl ether are preferred to furfural is that during the final cure and alkylation, no water is liberated. If we have resin consisting of chains as follows:

and we then heat it in the presence of furfural,

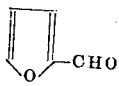

the group

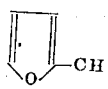

forms the connecting link between chains and the reaction liberates water. On the other hand, when triglycol dichloride or dichlor diethyl ether is used, the alkylation takes place at the amino groups by the shift or linking of the chlorine atoms to the nitrogen atoms, leaving available a bond at each end to connect the nitrogen atoms of adjacent chains (the nitrogen becoming so-called quinquevalent, as in the case of ammonium chloride).

This formation of water during the final curing is detrimental and causes swelling unless the wheel is being cured under pressure (as in a hot press or in an autoclave) excepting where a long enough time is allowed or the wheel is very porous. Consequently the present invention permits cold pressing for the formation of abrasive compositions that heretofore could not be satisfactorily made by the cold pressing method. However, since dichlor diethyl ether is a good wettant, a solvent for the aniline formaldehyde resin, and a cross-linking agent and, in fact, is an excellent "plasticizer" for abrasive grains for carrying out the dry granular mix method, there is considerable advantage in using dichlor diethyl ether even though for some reason or other the wheels are to be molded in a hot press. Furthermore, dichlor diethyl ether provides hydrogen chloride which is released at the grinding line and, therefore, the addition of other halogenated products may be dispensed with where a sufficient quantity of hydrogen chloride for the purpose is provided by the dichlor diethyl ether. The dichlor diethyl ether has the further advantages over furfural that it has a lower viscosity, a lower surface tension, and is not subject to deterioration under normal storage conditions.

However, mixtures of furfural and dichlor diethyl ether may be used, as they are miscible in all proportions. By the use of both furfural and triglycol dichloride, I can cause cross-linking at the ortho positions and also at the amino groups, in accordance with the explanations and diagrams already given. Thus I may proceed as in the following example.

*Example V*

Two hundred and ten grams of 80 grit fused alumina is stirred with four and five-tenths cubic centimeters of a mixture of equal parts by weight of furfural and dichlor diethyl ether. Twelve and eight-tenths grams of soluble anhydrite (CaSO$_4$) and forty-two and eight-tenths grams of aniline formaldehyde resin made from one and five-hundredths molecular proportions of formaldehyde are added. The whole is mixed. The granular mix is molded in a hot press for two hours at ninety pounds steam pressure (160° C.) under a pressure of three tons to the square inch.

In any of the examples, any other monomeric polyglycol dicloride selected from the group consisting of the di-, tri-, tetra- and penta-polyglycol dichlorides could have been used with substantially the same results and also in the same proportions; of all the compounds mentioned, I prefer triglycol dichloride because it is a better solvent than diglycol dichloride and more readily available than tetra- and penta-glycol dichloride.

The above is illustrative of ethers reactible with primary aromatic amine formaldehyde resins to form hardened resins and/or resinous products, and in the polymer they present, as illustrated by the linkages above set forth, the same general characteristic of a halide usually and preferably hydrogen chloride attached or linked thereto, and there has been in the above indicated various of the many advantages that accrue, not only in the resultant structures but also in the methods of handling or treating to arrive at such structures.

All of these polymers may be said to have a common or the same physical and chemical characteristic in that, because of the above-mentioned characteristic linkage of the halide, the latter is uniformly distributed throughout the mass of the resin or of the resinous bond, and in that sense the halide is uniformly available throughout the mass for progressive absorption or attraction of water and for possible interaction therewith.

Where the resin or resinous structure, as a final product, has porosity, as is frequently desirable in grinding wheel construction, in which furthermore differing degrees of porosity are desirable according to the differing abrasive characteristics desired, such porosity can be of undesired aid in physically bringing water or moisture, by way of the pores or cells, to more ready interaction with or attraction or absorption by the halide, and the polymers resulting from the use of the ethers can be, in preparation and treatment, controlled to give any porosity desired, as for example in making up grinding wheels, and hence my present invention can be better illustrated and set forth initially with reference first to such polymers.

Grinding wheels so constructed with such polymers, controlled in processing, as by varying according to circumstances the extent of compression of the mix, may therefore be said to be much more susceptible, when operated wet as with a water-coolant, to the effects of water or moisture than the same polymers when initially processed to have zero porosity. Such effects, as above pointed out, result in structural weakening, loss of strength of the resin, or resin-bonded structure, and in swelling, the effects increasing in intensity or rapidity of spreading from low values at zero porosity to increasing values as the degree of porosity increases.

Now, according to my invention, I am enabled to overcome these detrimental effects by converting the uniformly distributed halide into a different phase and virtually into a physical state such that, though initially supplied by the hardening agent and though initially uniformly distributed throughout the mass due to an initial linkage to or with the polymer, it now appears in an infinite number of uniformly distributed very minute physical entities probably chemically detached or un-bonded from the polymer, with each entity substantially totally enclosed in a cell of the hardened resin and thus physically isolated against attraction of or absorption of or interaction with water or moisture; and yet, under the action of grinding, with the heat evolved, these minute physical entities of the halide are made available at the grinding line, probably due to and as the cells enclosing the minute entities are worn or otherwise ruptured or broken open.

In regard to the above-mentioned changes of phase or state to achieve such actions as have just been noted, I incorporate in the mix, in preparing the ingredients for curing, substances which have the effect and action to remove the halide from those atoms in the resin molecule to which they are connected or linked, such as the atoms indicated in the various illustrative polymer linkages above set forth and to which the halide, hydrogen chloride, in these illustrations are connected. The cross-linking, as typified in the just-mentioned cross-linkages representing individual resin molecules, will be seen to have the effect of uniformly distributing the halide throughout the mass of the resin just as are the molecules of the latter distributed, but according to my invention the added substances, illustrations of which are about to be set forth, have the effect of disconnecting or removing the thus-distributed halide from the quaternary nitrogen atom or atoms in each resin molecule.

Usable substances for these purposes should not be too alkaline for the desired effects might not be achieved because the too high alkalinity would slow up or prevent the curing of the resin. Also it is preferable that they do not react with the hardening agent, such as the ethers faster than the hardening agent reacts with the resin. Moreover, by utilizing substances which react slower or with a delayed action as compared to the rate at which the hardening agent reacts with the resin, I am enabled to achieve certain unique coactions to better and more efficiently bring about the above-mentioned effects, as is later explained in greater detail. They should have sufficient solubility to react or a solubility to react at the desired rate, and the reaction preferably should not be such as to cause the formation of gases or vapors which might cause subsequent swelling of the resin or resinous body during curing.

The substances which, according to this divisional application, can be used are the metals lead, iron, zinc and copper, all of which are reactive metals.

Any such metal is included in the initial mix or is added to the mix, such as the illustrative mixes set forth in the examples in an amount on the order of 5% or so by volume, subsequent treatment of the mix being in any desired way of which the examples set forth above may be considered as illustrative.

The resultant final cured and hardened resin, or the final resinous product such as an abrasive article, even though given any desired porosity, is now found, when subjected to operation in the presence of moisture or water such as water coolant, to be well retentive of its strength in some cases and in others to have an effectively lower rate of loss of strength than is the case without treatment according to my invention; thus, in any case, length of life when the product is subjected to moisture or water is increased.

To illustrate these results, some numerical comparative values taken from test data might be set forth such as, for example, strength tests made of test bars which, in the tabulations of figures given below were all of the same dimension, namely, 6'' by 1'' by ¼'' and which has the same relative composition or proportions of ingredients, namely, by volume, 48% of #46 "Alundum" crystalline alumina abrasive grain, 22% of aniline formaldehyde resin, 10% of cryolite, 2% of soluble anhydrite, 10% of an illustrative hardening agent and abrasive grain wettant, namely triglycol dichloride, and 8% of the metal added thereto according to my invention; that is, the composition of the test bars numbered 1 to 5 inclusive of Table A, while test bars numbered 6 to 8 inclusive of Table B were of similar composition excepting that, for purposes of comparison, the composition omitted the above-mentioned metal. These test bars were soaked in water for periods of time as appear in the tables and at temperatures as indicated and these tables give comparative strengths for each bar prior to soaking and at the conclusion of the soaking, thus to show the rate at which, according to my invention, as illustrated in Table A, loss of strength is opposed, in contrast to the rate at which loss of strength occurs without treatment according to my invention as in Table B.

Table A

| Test Bar | Substance | Soaking Time | Temp. | Modulus of Rupture | |
|---|---|---|---|---|---|
| | | | | Initial | Final |
| | | Hours | ° C. | | |
| 1 | Lead | 36 | 20 | 7,700 | 7,500 |
| 2 | do | 20 | 100 | 6,940 | 6,880 |
| 3 | Iron | 36 | 20 | 4,730 | 4,885 |
| 4 | Zinc | 36 | 20 | 5,640 | 5,120 |
| 5 | Copper | 20 | 100 | 5,880 | 1,240 |

Table B

| Test Bar | Substance | Soaking Time | Temp. | Modulus of Rupture | |
|---|---|---|---|---|---|
| | | | | Initial | Final |
| | | Hours | ° C. | | |
| 6 | Standard | 36 | 20 | 8,480 | 623 |
| 7 | do | 20 | 100 | 7,820 | 700 |
| 8 | do | 6 | 100 | 10,200 | 1,238 |

The various metals are added to the mix in preferably dry, comminuted or powdered form, and thus they do not complicate whatever method of forming, shaping, molding, heat-treating, curing or the like, it may be desired to employ in completing the resin or resinous product. Some of the metals give better results than others, some are indicated to have better effects at different temperatures than others and all of them are effective for practical purposes, it being noted that particular requirements as to the condition under which the cured resin or the grinding wheel is to operate vary as to exposure to moisture or water and it being furthermore noted that the above tabulated test data is taken from soaking tests, conditions abnormally severe as compared to even the severest conditions under which a grinding wheel is to operate wet. Were the data contained in these tables to be translated into graphs, the graph for each test bar would be a straight line having a certain slope, and by comparing the slopes of the graphs resulting from Table A with the slopes of the graphs resulting from Table B, the improved results I am enabled to achieve according to my invention become graphically clearer and emphasized.

Thus, for example, the slope of the graph represented by the data with respect to test bars 1 and 2 is exceedingly slight, there being only a relatively very small loss of strength; as for test bar 3, the slope of the graph is upward instead of downward, there being an actual increase in the mechanical strength. The slopes of the graphs corresponding to the test bars in Table B, which were not made according to my present invention and hence are designated by the term "standard," is in contrast very steep in a downward direction, showing relatively rapid loss in strength.

The selected metal has, in the preferred mode of carrying out my invention, the characteristic of reacting slower than, or at a later stage in point of time, than the hardening agent reacts with the resin; as a result, the cross-linking or reaction between the hardening agent and the resin is well under way or may be substantially completed by the time the additive metal commences its reaction and hence the cross-linking can become effective first to bring about, as by linkage or connection to the nitrogen atom or amino group, the above-mentioned uniform distribution of the halide throughout the resinous mass, and thereupon the added ingredient or metal begins to react or does react with the linked halide, illustratively hydrogen chloride in the above illustrative linkages, and converts the halide into a different phase as above noted.

This conversion, according to desire, may be complete or it may be partial to any extent desired, according to the relative re-activity of the added metal. Thus, for example, the metals employed may react at a different rate according to the particular hardening agent employed; their rate of timing of re-activity may vary with temperature and hence I may effect some control of the rate of time of reaction of the added metal relative to the rate of reaction of the hardening agent with the resin by suitable variation or control, during the period of time of heat treatment or curing, of the temperature under which the latter takes place. Thus, for example, I may vary, as may be desired or found suitable, the rate and extent of temperature rise during the earlier or initial curing stages to suit, to any desired extent, the characteristics of the added metal as to its re-activity with change in temperature, so as to achieve the desired relative rates of reaction or the desired time delay between the two.

It will thus be seen that there has been provided in this invention a resin and resinous products and a method of making the same in which the various objects heretofore noted together with many thoroughly practical advantages are successfully achieved. The halide will be seen to be rendered incapable or substantially so of attracting or reacting with water or moisture and it will be seen that I am enabled greatly to extend the field of application of these various otherwise highly advantageous resins and resinous products. Where employed in the making of abrasive articles, the halide, though converted to a different phase is still available at the grinding line to contribute its beneficial action in a grinding operation, yet a grinding wheel so made can be run wet and still have long life.

The converted phase or different stage or composition of the halide can be physically demonstrated as can be also its physical isolation or cell-like enclosure or isolation in the hardened resin; thus, its extent or lack of reaction with water, for practical purposes, can be shown by comparative tests such as those of Tables A and B while its conversion can be shown if the resin or resinous structure is broken up and pulverized, thus in effect to break up the minute cellular casing structures and thus to expose the converted halide, and then testing in any usual laboratory way for the composition of the converted halide.

Moreover, the invention is of a thoroughly practical character, has many practical advantages, and lends itself well to adaption to commercial production.

As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. In a method of making an aniline formaldehyde resin the steps which comprise mixing reactive aniline formaldehyde resin with poly-glycol dichloride selected from the group consisting of the di-, tri-, tetra-, and penta-polyglycol dichlorides, and with metal selected from the group consisting of lead, iron, zinc and copper, placing the mix resulting from said mixing in a mold, pressing said mix in the mold, and heating the mix at such temperatures and for such time as to cure the resin and to cross link the aniline formaldehyde chains at the amino groups thereof with poly-glycol dichloride, and to react the HCl which, during the heating is bonded to the N atoms of the amino groups the Cl being derived from the poly-glycol dichloride, with said metal to form metal chloride in well distributed minute quantities in said resin but chemically not a part thereof.

2. In a method of making an aniline formaldehyde resin the steps which comprise mixing reactive aniline formaldehyde resin with poly-glycol dichloride selected from the group consisting of the di-, tri-, tetra-, and penta-polyglycol dichlorides and with iron, placing the mix resulting from said mixing in a mold, pressing said mix in the mold, and heating the mix at such temperatures and for such time as to cure the resin and to cross link the aniline formaldehyde chains at the amino groups thereof with poly-glycol dichloride, and to react the HCl which, during the heating is bonded to the N atoms of the amino groups the Cl being derived from the poly-glycol dichloride, with said iron to form iron chloride in well distributed minute quantities in said resin but chemically not a part thereof.

3. In a method of making an analine formaldehyde resin the steps which comprise mixing reactive aniline formaldehyde resin with poly-glycol dichloride selected from the group consisting of the di-, tri-, tetra-, and penta-poly-glycol dichlorides and with zinc, placing the mix resulting from said mixing in a mold, pressing said mix in the mold, and heating the mix at such temperatures and for such time as to cure the resin and to cross link the aniline formaldehyde chains at the amino groups thereof with poly-glycol dichloride, and to react the HCl which, during the heating is bonded to the N atoms of the amino groups the Cl being derived from the poly-glycol dichloride, with said zinc to form zinc chloride in well distributed minute quantities in said resin but chemically not a part thereof.

4. In a method of making an aniline formaldehyde resin the steps which comprise mixing reactive aniline formaldehyde resin with poly-glycol dichloride selected from the group consisting of the di-, tri-, tetra-, and penta-poly-glycol dichlorides and with copper, placing the mix resulting from said mixing in a mold, pressing said mix in the mold, and heating the mix at such temperatures and for such time as to cure the resin and to cross link the aniline formaldehyde chains at the amino groups thereof with poly-glycol dichloride, and to react the HCl which, during the heating is bonded to the N atoms of the amino groups the Cl being derived from the poly-glycol dichloride, with said copper to form copper chloride in well distributed minute quantities in said resin but chemically not a part thereof.

5. A composition of matter capable of curing to a water resistant resin comprising aniline formaldehyde resin, a poly-glycol dichloride selected from the group consisting of di-, tri-, tetra- and penta-, poly-glycol dichlorides, and a metal selected from the group consisting of lead, iron, zinc and copper, the metal being capable of reacting with the HCl which, during subsequent heating of the composition, becomes bonded to the N atoms of the amino groups, the Cl being derived from the poly-glycol dichloride, to form metal chloride in well distributed minute quantities in said resin but chemically not a part thereof.

6. The product obtained by heat curing the composition of claim 5.

7. A composition of matter according to claim 5 wherein the metal is iron.

8. A composition of matter according to claim 5 wherein the metal is zinc.

9. A composition of matter according to claim 5 wherein the metal is copper.

10. The product obtained by heat curing the composition of claim 5 and wherein the metal is iron.

11. The product obtained by heat curing the composition of claim 5 and wherein the metal is zinc.

12. The product obtained by heat curing the composition of claim 5 and wherein the metal is copper.

LORING COES, Jr.

No references cited.